United States Patent Office 3,828,051
Patented Aug. 6, 1974

3,828,051
PROCESS FOR PRODUCING PYRIDINE BASES
Yasuo Kusunoki and Hiroshi Okasaki, Kitakyushu, Japan, assignors to Nippon Steel Chemical Co., Ltd., Tokyo, Japan
No Drawing. Filed Nov. 15, 1971, Ser. No. 199,009
Int. Cl. C07d 31/08
U.S. Cl. 260—290 P                                     15 Claims

ABSTRACT OF THE DISCLOSURE

The process claimed is directed to the production of pyridine bases, especially MEP, wherein the content of α-picoline and, if desired, β-picoline are greatly increased. To increase the α-picoline content, paraldehyde is reacted in an ammoniacal alkaline environment, in the presence or absence of oxygen, with $NH_3$ and a copper compound. If also β-picoline is desired, a trioxane is added to the reaction. The reactivity of the copper is maintained substantially unabated if the reaction is carried out in the presence of oxygen or an oxygenous gas. Optimum production of α-picoline is achieved by using copper acetate and either methanol or ethanol. Paraldehyde may be used as an extracting solvent to improve the process. Typical operational parameters are 150–280° C. and 20–150 kg./cm.$^2$ pressure in the liquid phase.

PROCESS FOR PRODUCING PYRIDINE BASES

Field of the Invention

The present invention relates to a process for the production of pyridine bases and, more particularly, it relates to a process for the production of pyridine bases by reacting paraldehyde, ammonia and a copper compound, and if need be trioxane.

BACKGROUND OF THE INVENTION

Various processes hitherto, have been proposed for producing certain pyridine bases in which paraldehyde and ammonia are used as the starting materials. Some of these processes, commonly known as liquid phase processes, have been brought into practice in industry. These prior procsses for producing pyridine bases comprise essentially, reacting paraldehyde with concentrated aqueous ammonia in the liquid phase and in the presence of a catalyst, for example, ammonium acetate or fluorine compounds, at a temperature of from 200 to 280° C. and a pressure of 20 to 200 kg./cm.$^2$.

According to these known processes, 2-methyl-5-ethyl-pyridine (hereinafter referred to as MEP) is produced as the main product and, as for other pyridine bases, only α-picoline is coproduced but in an amount of only a few percent based on the amount of MEP produced.

MEP is useful as the raw material of nicotinic acid as well as of vinyl pyridines which are useful in modifying polymers. Other pyridine bases such as pyridine, α-picoline and β-picoline are also useful in various other fields; pyridine as an organic solvent and raw material for medicines; α-picoline as raw material for medicines, agricultural, chemicals and synthetic resins; and β-picoline as raw material for nicotinic acid and its derivatives.

It has, however, been always desirable to have a process for producing pyridine derivatives by which not only MEP but also other useful homologues such as pyridine, α-picoline and β-picoline can be obtained in substantial amounts.

BRIEF SUMMARY OF THE INVENTION

The present inventors have found that, in a process for the production of pyridine bases by reacting paraldehyde with ammonia, α-picoline is formed in a substantially increased amount in addition to MEP by making the reaction medium ammoniacally alkaline and by carrying out the reaction in the presence of a copper compound in an effective amount to react with said starting substances. They have also found unexpectedly that substantial amounts of pyridine, α-picoline and β-picoline are formed together with MEP by further conducting the reaction in the presence of trioxane together with said copper compound.

Moreover, it has been revealed through extensive research that the reactivity of the copper compound used in the reaction can be maintained substantially unabated by the presence of oxygen during the reaction whereby the ability to produce pyridine bases other than MEP can be extended; it has also been found that the yield of α-picoline in the reaction of ammonia with paraldehyde, carried out in an ammoniacal alkaline medium and in the presence of a copper compound, can be increased by preferably using copper acetate as the copper compound and conducting the reaction in the presence of methanol or ethanol. Furthermore, it has also been discovered that, by using paraldehyde itself as the extracting solvent in the recovery of the pyridine bases formed by the reaction, marked advantages in the practical operation of the process can be achieved.

Therefore, an object of the present invention is to offer an efficient process for the production of pyridine bases in which predominantly MEP and α-picoline are produced, each in such an amount as to permit their commercial utilization.

Another object of the present invention is to provide a process for the production of pyridine bases by which pyridine, α-picoline and β-picoline are produced together with MEP in substantial amount.

Other objects and advantages of the present invention will be more evident from detailed description given hereinafter.

DETAILED DESCRIPTION OF THE INVENTION

The present invention fundamentally relates to a process for the production of pyridine bases by the reaction of paraldehyde with ammonia wherein predominantly MEP and α-picoline are formed, which process comprises conducting the reaction in an ammoniacal alkaline medium and in the presence of a copper compound in an amount effective to react as a reactant in the reaction system with or without the concurrent presence of oxygen. Other embodiments of the invention include the following variants: a process in which predominantly MEP, pyridine, α-picoline and β-picoline are produced by conducting the reaction of the above fundamental process in the additional presence of trioxane; a process in which said fundamental process is modified to increase selectively the yield of α-picoline by conducting the reaction of the fundamental process using copper acetate as the copper compound in the presence of methanol or ethanol; and a process in which any one of the above processes is so modified that the pyridine bases formed are recovered advantageously from the reaction system by employing paraldehyde as the extracting solvent.

In all these embodiments of the present invention, the reaction is carried out usually, but not necessarily, at a temperature of from 150 to 280° C. under pressure and in the liquid phase. Preferred conditions are a temperature of from 200 to 240° C. and a pressure of from 20 to 150 kg./cm.$^2$ gauge.

When the reaction according to the present invention is to be carried out in the presence of oxygen, it is convenient to introduce into the reaction system an oxygen or an oxygen-containing gas, in which oxygen is diluted with an inert gas, such as air. In this case, it is preferable to introduce the oxygen or oxygen-containing gas continuously through the liquid phase in the reaction system, or to introduce the gas into the reaction system with concurrent agitation, so that the oxygen will be brought into sufficient contact with the liquid phase.

The amount of oxygen to be supplied to the reaction system, however, is not critical, and an amount from 0.1 to 0.5 moles per mole of paraldehyde is generally suitable. The introduction of oxygen into the reaction system can be done while the reaction is in progress or while the reaction is interrupted.

The copper compound to be used in the reaction according to the present invention acts like an oxidation catalyst; however, the anticipated purpose will not be attained if the copper compound is used only in an amount corresponding to that currently adopted for a common catalytic reaction. The copper compound is used according to the present invention in an amount sufficient to function as a reactant in the reaction system.

It is believed that the copper compound participates in the reaction according to the following equation:

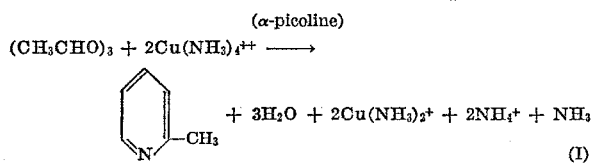

In this equation, $Cu(NH_3)_4^{++}$ is the complex cation due to the dissociation of the tetramine complex salt formed from the copper compound upon contact with ammonia in an ammoniacal alkaline medium in the reaction system. Cations of $Cu(NH_3)_2^+$ on the right side of equation (I) will presumably undergo a disproportionation reaction according to the equation

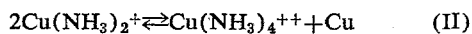

and thereby some of them will return to the original reactive divalent form with the simultaneous formation of metallic copper. Thus, it is very likely that the copper compound to be incorporated according to the present invention is not one which is employed in a catalytic amount, but it acts as one of the reactants in the reaction system. However, as will be explained later, it is unnecessary to use the copper compound in an amount equivalent to the paraldehyde, because the overall reaction proceeds as a competition between the reaction represented by equation (I) and the reaction expressed by the following equation

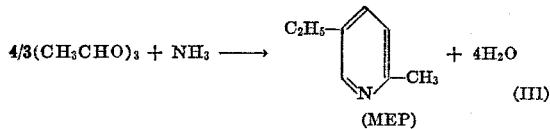

The copper compounds which may be used include the cupric salts of lower aliphatic carboxylic acids, as for example cupric formate, cupric acetate and cupric oxalate; cupric halides, as for example cupric fluoride, chloride and bromide; cupric sulfate; cupric nitrate; cupric phosphate and cupric carbonate. However, when conducting the reaction in the presence of oxygen, it is possible to use copper compounds in which the copper exists in a reduced state, i.e., cuprous state or even in the metallic state, because it has been confirmed by the present inventors that, after the cupric compounds lose their reactivity by being reduced to the cuprous or metallic state during the reaction, the oxygen present in the reaction system will regenerate their reactivity by re-oxidizing them.

The amount of the copper compound to be used is determined by the amount of paraldehyde used as the starting material and, in the case of a reaction in the absence of oxygen, 0.5 mole or more of the copper compound, calculated as metal, per mole of paraldehyde should preferably be used. However, care should be exercised for that, if the amount of the copper compound used is in large excess over that of the paraldehyde, the degree of conversion into pyridine bases decreases with the concurrent increase of side reactions. It is preferable in general to use the copper compound in an amount of from 0.5 to about 3 moles per mole of paraldehyde; however, when using trioxane together with paraldehyde, the use of the copper compound in an amount of from 0.5 to 3.0 moles per total combined moles of paraldehyde and trioxane is preferred.

When the reaction is carried out in the presence of oxygen, it is possible to reduce substantially the amount of the copper compound used, probably because the reaction of the foregoing equation (I) does not proceed in a single step, but in such a manner that the paraldehyde is first decomposed into acetaldehyde and the acetaledhyde molecules thus formed then contribute to the formation of the pyridine nucleus. Therefore, the rate determining step of the reaction is the decomposition of paraldehyde into acetaldehyde. Accordingly, the real concentration of acetaldehyde being liberated into the reaction system and actually participating in the reaction is considerably low; hence, it is sufficient to use the copper compound in an amount corresponding to the real concentration of acetaldehyde present and not equivalent to the paraldehyde. If oxygen is additionally present in the reaction system, the cuprous as well as metallic copper formed by the reduction during the reaction will be-reoxidized by the oxygen to regenerate the cupric compound rapidly, so that only a small amount of the copper compound may be employed in the reaction system.

These copper compounds participate in the reaction through the formation of amine complexes with ammonia. Therefore, the amount of ammonia to be used in the process must be sufficient to form a water-soluble copper tetramine complex so that the ammonia may participate in the reaction smoothly in a homogeneous phase; in other words, the amount should be sufficient to retain the reaction system in an ammoniacal alkaline state. Generally, an amount of from 4 to 10 moles of ammonia per mole of copper compound, calculated as metallic copper is preferable. If the amount of ammonia used per mole of copper compound is 2 moles or less, copper-tetramine complexes will not be formed, but the water insoluble diamine complex is instead formed, which is undesirable.

The proportion of pyridine bases produced by the reaction varies with the anion moiety of the cupric compound used. For example, the yield of $\alpha$-picoline will be greater with cupric fluoride, acetate, sulfate and nitrate than with cupric chloride and bromide, when used in the same quantity.

If the reaction is carried out in the presence of oxygen, an additional advantage can be attained, since the reactivity of the copper compound can easily be restored by the presence of oxygen in the reaction system and the productivity of the desired specific pyridine bases can be maintained without further additions of copper compound. In particular, when oxygen is present in the production of MEP and $\alpha$-picoline by reacting paraldehyde with an excess of ammonia in the presence of the copper compound, it is possible to increase the yield of $\alpha$-picoline. In this case, however, as described previously, it is preferable to supply oxygen in an amount of from about 0.1 to 0.5 moles per mole of paraldehyde a supply of oxygen greater than 1 mole/mole leading merely to a decrease in the conversion of oxygen. Moreover, since the reactivity of the copper compound can be maintained by merely supplying oxygen into the reaction system, the procedural operation can be simplified and rendered economically advantageous.

As mentioned previously, it is possible to produce not only MEP but also pyridine, $\alpha$-picoline and $\beta$-picoline at the same time by the presence of trioxane in the reaction system. It is believed that the trioxane participates in the reaction after it has been decomposed into formaldehyde;

however, no indication of side reactions nor of decrease in conversion such as occurring when using formaldehyde (formalin) could be found. The amount of trioxane used is preferably from 0.5 to 3.0 moles per mole of paraldehyde. The use of trioxane in an amount larger than 3.0 moles per mole of paraldehyde is not desirable, because side reactions are facilitated thereby and the conversion into the desired pyridine bases will be decreased. On the other hand, if trioxane is used in an amount smaller than 0.5 moles per mole of paraldehyde, the formation of MEP is increased and the conversion into pyridine and picolines is decreased. The properly predetermined use of trioxane offers the advantage that the proportion of the pyridine bases produced may be varied at will within a wide range by varying the amount of trioxane used. If necessary, it is possible to add alcohols, ammonium salts and the like to the reaction system.

An advantageous embodiment within the scope of the present invention comprises using cupric acetate as the copper compound in the reaction of paraldehyde with ammonia and conducting the reaction in the presence of methanol or ethanol, in order to increase the amount of α-picoline which is formed together with MEP. According to this embodiment, methanol or ethanol acts to maintain the homogeneity of the reaction system by increasing the affinity between the phase containing predominantly paraldehyde and the aqueous ammonia phase containing copper acetate so that paraldehyde and cupric acetate will be brought into contact efficiently during the reaction to cause a corresponding increase in the reactivity of cupric acetate and, thus, an increase in the production of α-picoline. Cupric acetate, compared to other cupric compounds, is believed to form a homogeneous phase easily in the reaction system, because it exhibits a higher affinity toward the aqueous ammoniacal phase as well as toward the organic phase contaninig paraldehyde and alcohol. The amount of cupric acetate used is preferably in the range of from 0.05 to 2.5 moles per mole of paraldehyde. It is advantageous to adjust the volume of methanol or ethanol within the range of from 0.5 to 3.0 times the volume of the aqueous ammoniacal solution of cupric acetate at ordinary temperature.

The volume of the aqueous ammoniacal solution of cupric acetate is to be understood to mean the volume of the aqueous ammonia phase containing cupric acetate which separates out when the mixture of reactants is allowed to stand before initiation of the reaction.

The above-mentioned increase in the production of α-picoline can no longer be attained if the volume of methanol or ethanol is smaller than 0.5 times the volume of paraldehyde; on the other hand, the use of alcohol in a volume greater than 3 times the volume of paraldehyde will cause a decrease in the concentration of reactants and is not desirable. If oxygen is additionally introduced in the system, a still further increase in the production of α-picoline can be obtained and, at the same time, the amount of copper acetate used may be decreased. In the practical execution of this process, the reaction system can be stabilized if ammonium acetate, acetamide or the like is introduced to the system.

The pyridine compounds formed by the reaction according to the embodiments of the present invention can be extracted, as will be explained below, from the reaction mixture by employing paraldehyde itself as the extracting solvent.

Heretofore, many processes for the recovery of pyridine bases by the reaction of paraldehyde with ammonia in the presence of a catalyst have involved such operations as, for example, distillation or extraction using (as the extracting solvent) benzene, toleune, chloroform, ethylene dichloride or ether.

However, the reaction product obtained by the above prior art processes exists usually as a liquid consisting of two separate phases, as long as a solvent having a tendency to form a homogeneous phase, such as an alcohol, has not been incorporated. Thus, the reaction product will separate into two phases, an organic one rich in pyridine bases and an aqueous one consisting predominantly of aqueous ammonia and rich in the catalyst. Therefore, the essential procedure of the prior processes consists of either separating the organic phase to recover the pyridine bases by distillation while drawing out a portion of the aqueous phase and subjecting it to distillation in order to recover ammonia and pyridine bases and concurrently removing water and returning the rest of the aqueous phase to the reaction system after replenishing with fresh starting materials; or subjecting the reaction mixture as a whole to an extraction using one of the mentioned extracting solvents. However, as the recycling of the aqueous solution containing the catalyst is repeated, resinous polymeric materials formed by side reactions will appear as sludgy deposits in the reaction liquid, and as the result, the reacton mixture will separate into two distinct layers with difficulty and the reactor will be rendered less efficient by the sludgy deposits.

Moreover, in the case of benzene or the like, the water content in the aqueous phase increases, because of the difficulty in the removal of the water by benzene, in which water is practically insoluble. Removal of a portion of the aqueous phase during the recycling thereof will become thus necessary in order to hold the volume of the reaction liquid constant and, therefore, a need for the replenishment of the catalyst will arise.

On the other hand, if the reaction is carried out in an homogeneous phase by incorporating an alcohol in the system, it is not possible to separate the portion rich in pyridine bases because the reaction product exists as a homogeneous phase. If, in this case, the reaction product (as such) is subjected to distillation, the recycling of the aqueous solution of the catalyst becomes a problem even if separation of the pyridine bases is possible. In particular, in the case of a copper compound as the catalyst, the copper amine complexes formed during the reaction will be decomposed by the heat applied during distillation.

Furthermore, when the reaction product from the above homogeneous phase reaction is extracted with a common solvent such as benzene, the homogeneous phase-forming alcohol will be distributed both in the aqueous phase as well as in the organic phase and a considerable amount of the extracting agent will be carried into the aqueous phase because the homogeneous phase-forming solvent is also present in the aqueous phase. Consequently, if such an aqueous phase is to be recycled, it is difficult to maintain the reaction system in a homogeneous phase, because the extracting agent is present in said aqueous agent, so that a larger amount of the homogeneous phase-forming solvent will have to be used. In addition, even the reaction itself will be affected adversely; for example, the production of α-picoline will cease upon continued recycling, due to the presence of the extracting solvent as the third component in the reaction system.

The present inventors have discovered that the shortcomings described above can be overcome by using paraldehyde itself as the extracting solvent. This compound is comparatively stable at temperatures around room temperature in an ammoniacal alkaline medium and can therefore be used satisfactorily as the extracting solvent without decomposition during the extraction operation. Also it has an excellent ability to dissolve the by-product resinous polymers and a large partition coefficient against pyridine bases. Moreover, paraldehyde has a relatively high compatibility with water compared to other known extracting solvents, so that it enables the removal of water formed by the reaction. Paraldehyde has the further advantage of being one of the starting materials of the process of the present invention, and, therefore, no operational trouble will arise if it is distributed into the aqueous phase from which the reaction products have been removed.

With paraldehyde as the extracting agent for the reaction products, the extraction may be carried out by adding paraldehyde directly to the reaction product if the reaction product is present in two separate phases, however, or by applying the paraldehyde after the organic phase has been separated.

The amount of paraldehyde to be used is determinedly based on the content of the pyridine bases in the reaction mixture, on the extractability of the pyridine bases and the amount to be subjected to distillation.

If the reaction products are present as an homogeneous phase, the use of a comparatively large amount of paraldehyde is necessary. When the amount of paraldehyde used is smaller, the paraldehyde will dissolve in the reaction products, and the formation of two separate phases may sometimes be hindered. For the extraction in the first stage, paraldehyde in a volume of from ⅓ to ½ that of the reaction products may be necessary. This volume can be decreased as the extraction progress is through the succeeding stages. According to experiments, the extraction of pyridine bases as well as of the by-product resinous polymers can generally be effected satisfactorily, when paraldehyde is used in such an amount as to dissolve completely the water formed by the reaction, which must be drained off from the reaction system.

The extraction can be completed in a single step; however, it is also possible to effect the extraction in 2, 3 or more steps. A multistage countercurrent extraction procedure is most effective.

The extract thus obtained contains pyridine compounds, resinous polymer materials, water and small amounts of ammonia in addition to paraldehyde and, in the case of extraction from a homogeneous phase, other solvents such as an alcohol may also be present. It may then be possible to recover purified pyridine bases and other components from the extract by subjecting the latter to distillation. The raffinate is recycled to the reaction system.

Examples 1–15

A 100 ml. autoclave was charged with 0.1 mole of paraldehyde, 0.8 mole of ammonia (as 28% aqueous solution) and one of the cupric compounds listed in Table 1, and the reaction was carried out at 230° C. for 1 hour with stirring. The results are given in Table 1.

The results of three comparative control experiments (A, B, C) in which the above procedure was repeated with the exception of using ammonium acetate and nitrate instead of a cupric compound, are also given in Table 1.

TABLE 1

| Example | Catalyst | Moles of catalyst | Percent conversion | Percent Selectivity α-picoline | Percent Selectivity MEP | Percent yield of α-picoline |
|---|---|---|---|---|---|---|
| 1 | Cupric acetate | 0.05 | 92.2 | 9.0 | 56.8 | 13.7 |
| 2 | do | 0.1 | 91.7 | 18.9 | 45.9 | 29.2 |
| 3 | do | 0.15 | 91.9 | 28.8 | 35.5 | 44.6 |
| 4 | do | 0.2 | 73.8 | 29.4 | 22.2 | 56.6 |
| 5 | do | 0.25 | 70.7 | 30.4 | 17.5 | 62.8 |
| 6 | Cupric nitrate | 0.1 | 87.6 | 7.6 | 32.9 | 18.8 |
| 7 | do | 0.15 | 72.4 | 6.1 | 14.9 | 29.0 |
| 8 | Cupric sulphate | 0.15 | 86.1 | 16.3 | 30.6 | 34.8 |
| 9 | Cupric fluoride | 0.15 | 83.6 | 25.3 | 23.0 | 52.5 |
| 10 | Cupric choride | 0.15 | 78.0 | 4.8 | 35.0 | 12.0 |
| 11 | Cupric bromide | 0.15 | 65.4 | 6.1 | 39.2 | 13.4 |
| 12 | Cupric phosphate | 0.1 | 90.3 | 10.3 | 34.5 | 23.1 |
| 13 | Cupric carlonate | 0.1 | 86.5 | 9.7 | 22.1 | 25.2 |
| 14 | Cupric formiate | 0.1 | 82.1 | 8.8 | 38.3 | 19.5 |
| 15 | Cupric oxalate | 0.1 | 92.0 | 7.2 | 34.5 | 17.2 |
| A | Ammonium acetate | 0.1 | 88.7 | 3.0 | 84.2 | 3.4 |
| B | do | 0.3 | 92.6 | 1.3 | 88.0 | 1.5 |
| C | Ammonium nitrate | 0.2 | 94.6 | 2.5 | 80.0 | 3.0 |

In Table 1, the conversion and selectivity were calculated in accordance with the following equations, respectively.

Percent Conversion =

$$\frac{\text{charged paraldehyde (mole)} - \text{unreacted paraldehyde}}{\text{charged paraldehyde (mole)}} \times 100$$

Percent Selectivity =

$$\frac{\text{Product (mole)} \times a}{\text{charged paraldehyde (mole)} - \text{unreacted paraldehyde (mole)}} \times 100$$

wherein $a$ is 1 when the product is α-picoline and 4/3 when the product is MEP

Percent yield of α-picoline =

$$\frac{\text{α-picoline produced (mole)}}{\text{total of pyridine bases produced}} \times 100$$

Examples 16–18

A 100 ml. autoclave was charged with 0.05 mole of paraldehyde, 0.05 mole of trioxane, 0.8 mole of ammonia (as 28% aqueous solution) and 0.15 mole of one of the cupric compounds listed in Table 2, and the reaction was carried out at 230° C. for 1 hour. The results are given in Table 2.

Example 19

A 100 ml. autoclave was charged with 0.05 mole of paraldehyde, 0.1 mole of trioxane, 0.8 mole of ammonia (as 28% aqueous solution) and 0.15 mole of cupric sulfate, and the reaction was carried out in the same manner as in examples 16–18. The results are given in Table 2.

Comparative Example D

A mixture of 0.5 mole of paraldehyde, 0.05 mole of trioxane, 0.8 mole of ammonia and 0.1 mole of ammonium acetate instead of the cupric compound was used and the procedure of examples 16–18 was employed. The results are given in Table 2.

TABLE 2

| | Example 16 | Example 17 | Example 18 | Example 19 | Comparative Example D |
|---|---|---|---|---|---|
| Copper compound | $Cu(CH_3COO)_2 \cdot H_2O$ | $CuF_2 \cdot 2H_2O$ | $CuSO_4 \cdot 5H_2O$ | $CuSO_4 \cdot 5H_2O$ | $CH_3COONH_4$ |
| Percent conversion of paraldehyde | 87.1 | 83.0 | 87.9 | 67.4 | 91.2 |
| Percent conversion of trioxane | 25.4 | 22.2 | 31.0 | 23.6 | 1.3 |
| Percent yield of (in mg): | | | | | |
| Pyridine | 123 | 197 | 244 | 342 | |
| α-picoline | 765 | 659 | 554 | 428 | 16 |
| β-picoline | 14 | 20 | 113 | 197 | |
| MEP | 597 | 200 | 522 | 320 | 1,108 |
| Other pyridine bases | 10 | 14 | 213 | 184 | |

Example 20

A 500 ml. column reactor made of titanium was charged with 0.25 moles of cupric chloride $(CuCl_2 \cdot 2H_2O)$ 0.5 moles (66 g.) of paraldehyde and 3.35 moles of ammonia (as 28% aq. solution), and the reaction was carried out at 200° C. and 50 kg./cm.² pressure for 2 hours with continued introduction of air at a rate of 6.9 Nl./hr. After the reaction was completed, the reactor was cooled and the contents were analyzed by gas chromatography.

The results were as follows:

| | Percent |
|---|---|
| Conversion of paraldehyde | 72.0 |
| Oxygen absorbed | 65 |
| Yield, based on converted paraldehyde: | |
| α-Picoline | 20.0 |
| MEP | 14.7 |
| Ratio of α-picoline/MEP (by weight) | 1.40 |

Example 21

A 200 ml. stainless steel autoclave equipped with stirrer was charged with 0.1 moles (13.2 g.) of paraldehyde, 0.75 moles of ammonia (as 28% aq. solution) and 0.1 mole of copper acetate. Then, after air equivalent to 0.0172 moles of oxygen was introduced into the autoclave, the reaction was conducted at 220° C. for 2 hours.

For comparison, two control experiments were made: in one, the above procedure was repeated without addition of oxygen (referred to as control E) and in the other, the above procedure was so modified that 0.1 mole of ammonium acetate was used instead of copper acetate and the reaction was carried out at 230° C. for 1 hour without addition of air (control F). The results of these experiments are summarized as follows:

| | Example 21 | Control E | Control F |
|---|---|---|---|
| Percent conversion of paraldehyde | 99.7 | 96.8 | 88.7 |
| Percent yield, based on converted paraldehyde: | | | |
| α-picoline | 18.7 | 11.9 | 2.5 |
| MEP | 40.9 | 53.8 | 80.2 |
| Ratio of α-picoline/MEP (by wt.) | 0.47 | 0.23 | 0.03 |

Example 22

A series of experiments was made in which a 200 ml. stainless steel autoclave equipped with stirrer was charged with 0.133 moles of paraldehyde, 1.0 mole of ammonia (as 28% aq. solution) and a predetermined amount of cupric acetate $[Cu(CH_3COO)_2 \cdot H_2O]$ together with methanol or ethanol and the reaction was conducted at 220° C. for 1 hour while in some cases air was charged by a compressor into the gas space of the reactor before the reaction started. In all of these experiments, the reaction liquid was homogeneous before and after the reaction.

Example 23

The reaction was carried out without the addition of methanol or ethanol in the same manner as Example 22. The reaction liquid was present in two phases before and after the reaction.

Comparison example G

The reaction was carried out as in Example 22 without the addition or methanol or ethanol and 0.133 moles of ammonium acetate were used in place of copper acetate. The results are given below in Table 3 together with those of Examples 22 and 23.

TABLE 3

| | Example 22 | | | | | Example 23 | | | | Comparison Example G |
|---|---|---|---|---|---|---|---|---|---|---|
| Experiment number | 1 | 2 | 3 | 4 | 5 | 6 | 7 | 8 | 9 | |
| Amount of copper acetate added (moles) | 0.133 | 0.133 | 0.200 | 0.200 | 0.200 | 0.133 | 0.133 | 0.200 | 0.200 | |
| Amount of methanol or ethanol added (ml.) | ¹70 | ¹70 | ¹70 | ¹70 | ²62 | | | | | |
| Amount of oxygen charged (moles) | | 0.207 | | 0.027 | | | 0.033 | | 0.033 | |
| Total amount of reaction liquid at room temp. (ml.) | 165 | 165 | 165 | 165 | 160 | 100 | 100 | 100 | 100 | 100 |
| Conversion of paraldehyde (percent) | 78.8 | 82.1 | 93.4 | 93.8 | 89.6 | 98.3 | 99 | 95.7 | 98.8 | 86.3 |
| Yield of pyridine base based on converted paraldehyde (percent): | | | | | | | | | | |
| γ-picoline | 21.8 | 32.4 | 35.8 | 43.6 | 33.4 | 12.6 | 14.2 | 14.5 | 21.2 | 2.6 |
| MEP | 46.7 | 36.6 | 28.6 | 22.3 | 34.3 | 51.6 | 51.2 | 48.9 | 40.2 | 82.1 |
| Ratio α-picoline/MEP (by weight) | 0.48 | 0.19 | 1.27 | 2.00 | 1.00 | 0.25 | 0.29 | 0.31 | 0.54 | 0.03 |

¹ Methanol.  ² Ethanol.

Example 24

To the same reactor of Example 22 were charged 0.08 moles of paraldehyde, 0.12 moles of copper acetate, 0.72 moles of ammonia (as 28% aq. solution) and 50 ml. of methanol, and the reaction was carried out at 220° C. for 1 hour with stirring. After cooling, the contents were removed from the reactor, 0.278 moles of gaseous ammonia were introduced, 9 grams of ammonium acetate further added, and the resulting mixture was returned to the reactor. Thereafter, air was forced into the gas phase in the reactor at a pressure of 40 kg./cm.² and the contents were stirred at room temperature for 5 minutes to absorb oxygen. By repeating this procedure of introduction of air and stirring, the copper contained was completely converted into the cupric state. To this liquid were further added 0.08 moles of paraldehyde and the contents were allowed to react again at 220° C. for 1 hour with stirring. Upon completion of the reaction, the reactor was cooled and the contents were removed and analysed by gas chromatography. The results are as follows:

| | Percent |
|---|---|
| Conversion of paraldehyde, based on the total amount of the two reactions | 92.4 |
| Yield, based on converted paraldehyde: | |
| α-Picoline | 37.7 |
| MEP | 33.5 |
| Ratio α-picoline/MEP, (by weight) 1.15 | |

Example 25

A mixture of 0.067 moles of paraldehyde, 0.8 moles of ammonia, 0.1 mole of copper acetate, 0.183 moles of acetamide, 35 g. of water and 40 g. of methanol in a 200 ml. autoclave was heated to 220° C. in about 25 minutes and allowed to react at that temperature for 1 hour with agitation. The reaction liquid was present as a single homogeneous phase before and after the reaction. After the reacted mixture was cooled, the copper catalyst which had been reduced was oxidized and regenerated by introducing 4.5 Nl. of air into the autoclave by means of a compressor and stirring for 5 minutes. Then, to this mixture were further added 0.067 moles of paraldehyde, the resulting mixture was again allowed to react under the same conditions and thereafter the catalyst was again regenerated by oxidation. The reaction mixture, after it was removed and mixed with 50 ml. of paraldehyde with sufficient agitation, separated into two distinct layers. After the upper layer was removed, 30 ml. of paraldehyde were added to the bottom layer and the mixture was shaken thoroughly and left standing. The upper layer formed was separated. The sum of these paraldehyde extracts amounted to about 120 g. and contained 3.8 g. of α-picoline, 4.7 g. of 2-methyl-5-ethyl-pyridine, 15 g. of methanol, 9.6 g. of water and 5.5 g. of by-product resinous polymers. The lower phase, about 100 g., was an aqueous solution of the catalyst containing 2.3 g. of paraldehyde distributed therein.

To this lower phase were further added 0.05 moles of paraldehyde, 0.135 moles of ammonia, 0.002 moles of copper acetate, 16 g. of methanol and 3.9 g. of ammonium acetate to obtain a composition almost identical to the original solution before the reaction, and the above procedure, namely the reaction and the regeneration of the catalyst by oxidation, was twice repeated.

It was possible to carry out the recovery of methanol and paraldehyde, the removal of water by azeotropic distillation as well as the purification of the pyridine bases by distillation, after subjecting the reaction mixture to extraction by the same procedure as above and conducting the distillation of the extract together with the extract from the first procedure.

The overall results of the four reactions are as follows:

| | Percent |
|---|---|
| Conversion of paraldehyde | 98 |
| Yield of α-picoline, mole | 29.6 |
| Yield of 2-methyl-5-ethyl-pyridine, mole | 41.2 |

Example 26

A mixture of 0.2 moles of paraldehyde, 1.4 moles of ammonia, 0.2 moles of cupric chloride and 60 g. of water was allowed to react at 220° C. for 1 hour. After cooling, the catalyst which had been reduced was regenerated by oxidation with air. To this, 0.2 moles of fresh paraldehyde were added and the mixture was again subjected to the process of reaction and catalyst regeneration. Then, the reaction mixture was transferred to a separatory funnel. The separated lower layer consisting of a catalyst-containing aqueous solution was extracted three times with paraldehyde, first with 50 ml., then with 30 ml. and finally with 20 ml. for a total of 100 ml. The raffinate was replenished only with as much ammonia and paraldehyde as were consumed and the reaction was repeated again. This procedure was repeated once more; thus the reaction was conducted 6 times and the extraction 3 times in all. Scarcely no change in the results of the reaction and in the reaction volume was observed. The overall results of the 6 reactions are as follows:

| | Percent |
|---|---|
| Conversion of paraldehyde | 95 |
| Yield of α-picoline | 13.4 |
| Yield of 2-methyl-5-ethyl-pyridine | 49.3 |

Comparison example H

The reaction was conducted twice in the same manner as in example 24. The resulting reaction mixture was found to form a sludge upon extraction with 50 ml. of benzene, and considerable time was required for the phase separation. The reaction mixture after two more reactions did not separate into two distinct phases even when left standing overnight after extraction with benzene, and the operation was not possible unless the formed sludge was removed.

Comparison example I

The reaction was conducted twice in the same manner as in Example 24. Then, the extraction was carried out with chloroform in place of paraldehyde. After replenishing the raffinate with ammonia, paraldehyde, methanol and the catalyst component, the reaction was repeated twice and then the extraction was carried out with chloroform. The results of the first two reactions are as follows:

Yield of α-picoline (mole percent) ____ 33.7
Yield of 2-methyl-5-ethyl-pyridine (mole percent) __ 30.8

On the other hand, an analysis of the extract of the last two reactions showed a sharp decrease in the yield of α-picoline. The results of the last two reactions are as follows:

Yield of α-picoline (mole percent) ____ 5.9
Yield of 2-methyl-5-ethyl-pyridine (mole percent) __ 59.4

What we claim and wish to secure by Letters Patent of the United States is:

1. In a process for the production of pyridine bases by reacting paraldehyde with aqueous ammonia in the liquid phase at a temperature of 150–280° C., the improvement which comprises increasing the proportion of α-picoline to the pyridine bases produced by effecting the reaction using at least 0.5 moles of a cupric salt, calculated as metal, per mole of paraldehyde, and selected from the group consisting of cupric salts of lower aliphatic carboxylic acids, copper halides, copper sulfate, copper nitrate, copper phosphate and copper carbonate, and the amount of ammonia used is more than two moles per mole of cupric salt, calculated as metal.

2. The process for producing pyridine bases, according to claim 1, wherein said reacting is carried out in the presence of a gas selected from oxygen and oxygen-containing gas.

3. The process for producing pyridine bases, according to claim 1, wherein said reacting is carried out in the absence of oxygen.

4. The process for producing pyridine bases, according to claim 1, wherein the reaction is carried out in the presence of trioxane.

5. The process for producing pyridine bases, according to claim 1, wherein said copper compound is copper acetate and wherein the reaction is carried out in the presence of an alcohol selected from methanol and ethanol.

6. The process for producing pyridine bases, according to claim 4, wherein said trioxane is used in an amount of from 0.5 to 3.0 moles of trioxane per mole of paraldehyde.

7. The process for producing pyridine bases, according to claim 2, wherein the amount of oxygen is at least 0.1 mole per mole of paraldehyde.

8. The process for producing pyridine bases, according to claim 2, wherein said gas is introduced into the reaction system at a temperature from room temperature to 300° C. under at least atmospheric pressure after stopping the reaction.

9. The process for producing pyridine bases, according to claim 5, wherein said alcohol is used in an amount of at least 0.5 times the volume of aqueous ammonia solution of copper acetate.

10. The process for producing pyridine bases, according to claim 1 which further comprises extracting said reaction mixture with paraldehyde.

11. The process for producing pyridine bases, according to claim 1, wherein said reaction mixture consists of an aqueous phase and an organic phase and said aqueous phase is recycled to the reaction system.

12. The process for producing pyridine bases, according to claim 9, wherein the reaction mixture is a homogeneous phase.

13. The process for producing pyridine bases, according to claim 10, which further comprises recycling a raffinate to the reaction system.

14. The process for producing pyridine bases, according to claim 1, wherein said pyridine bases are predominantly 2-methyl-5-ethyl-pyridine and α-picoline.

15. The process for producing pyridine bases, according to claim 4, wherein said pyridine bases are predominantly 2-methyl-5-ethylpyridine, pyridine, α-picoline and β-picoline.

References Cited

UNITED STATES PATENTS

| 2,775,596 | 12/1956 | Mahan | 260—290 |
| 2,700,042 | 1/1955 | Aries | 260—290 |

FOREIGN PATENTS

| 7,339 | 5/1963 | Japan | 260—290 |
| 890,957 | 9/1953 | Germany | 260—290 |
| 896,648 | 11/1953 | Germany | 260—290 |
| 534,494 | 3/1941 | England | 260—290 |
| 1,070,664 | 6/1967 | England | 260—290 |

HARRY I. MOATZ, Primary Examiner